United States Patent
Kasahara

(10) Patent No.: US 10,075,644 B2
(45) Date of Patent: Sep. 11, 2018

(54) INFORMATION PROCESSING APPARATUS AND INFORMATION PROCESSING METHOD

(75) Inventor: Shunichi Kasahara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 717 days.

(21) Appl. No.: 13/022,676

(22) Filed: Feb. 8, 2011

(65) Prior Publication Data

US 2011/0221893 A1  Sep. 15, 2011

(30) Foreign Application Priority Data

Mar. 15, 2010  (JP) ................................ 2010-057856

(51) Int. Cl.
*H04N 5/378* (2011.01)
*H04N 5/232* (2006.01)
*G06F 3/0484* (2013.01)
*H04N 5/225* (2006.01)
*H04N 5/235* (2006.01)

(52) U.S. Cl.
CPC ..... *H04N 5/23293* (2013.01); *G06F 3/04845* (2013.01); *H04N 5/2256* (2013.01); *H04N 5/2354* (2013.01); *H04N 5/23216* (2013.01); *H04N 5/23296* (2013.01); *G06F 2203/04806* (2013.01)

(58) Field of Classification Search
CPC ............... H04N 7/18; H04N 5/23293; H04N 2201/0094; H04N 5/23212; H04N 5/2351; H04N 5/2254; H04N 5/2256; H04N 5/232; H04N 5/23296
See application file for complete search history.

(56) References Cited

U.S. PATENT DOCUMENTS

| 5,432,543 | A  | * | 7/1995 | Hasegawa et al. ............. 348/45 |
| 7,504,649 | B2 | * | 3/2009 | Hasegawa et al. ........... 250/586 |
| 8,111,315 | B2 | * | 2/2012 | Uchida .................... 348/333.02 |
| 8,132,887 | B2 | * | 3/2012 | Friedman ............ B41F 33/0045 347/14 |
| 8,471,213 | B2 | * | 6/2013 | Yagi .......................... G01T 1/00 250/370.09 |
| 2002/0080377 | A1 | * | 6/2002 | Tonami ................ H04N 1/4053 358/1.9 |
| 2005/0256395 | A1 | * | 11/2005 | Anabuki ............... G06T 7/0018 600/414 |
| 2006/0262193 | A1 | * | 11/2006 | Kumaki ............. H04N 5/23248 348/208.6 |

(Continued)

FOREIGN PATENT DOCUMENTS

JP   2008-129120   6/2008

*Primary Examiner* — Dave Czekaj
*Assistant Examiner* — Kehinde O Abimbola
(74) *Attorney, Agent, or Firm* — Chip Law Group

(57) ABSTRACT

There is provided an information processing apparatus including an image obtaining unit for obtaining a captured image onto which an emission graphic image including a marker serving as a reference is emitted and a correction information generation unit for generating correction information, for making an emission range and an image capturing range be the same, from a difference between the emission range onto which the emission graphic image is emitted and the image capturing range of the captured image, based on the marker in the captured image and the marker in the emission graphic image.

6 Claims, 21 Drawing Sheets

(56) References Cited

U.S. PATENT DOCUMENTS

| | | | | |
|---|---|---|---|---|
| 2007/0096040 | A1* | 5/2007 | Hasegawa et al. | 250/484.4 |
| 2007/0236561 | A1* | 10/2007 | Anai et al. | 348/46 |
| 2008/0043298 | A1* | 2/2008 | Ide | 358/509 |
| 2008/0107359 | A1* | 5/2008 | Chikaoka et al. | 382/312 |
| 2009/0002520 | A1* | 1/2009 | Yoshida | H04N 3/1562 348/226.1 |
| 2009/0102940 | A1* | 4/2009 | Uchida | 348/222.1 |
| 2009/0290472 | A1* | 11/2009 | Nakamura | G11B 7/0065 369/103 |
| 2010/0155614 | A1* | 6/2010 | Yagi | G01T 1/00 250/370.09 |
| 2011/0216120 | A1* | 9/2011 | Friedman | B41F 33/0045 347/19 |
| 2011/0221893 | A1* | 9/2011 | Kasahara | 348/136 |

* cited by examiner

FIG. 1
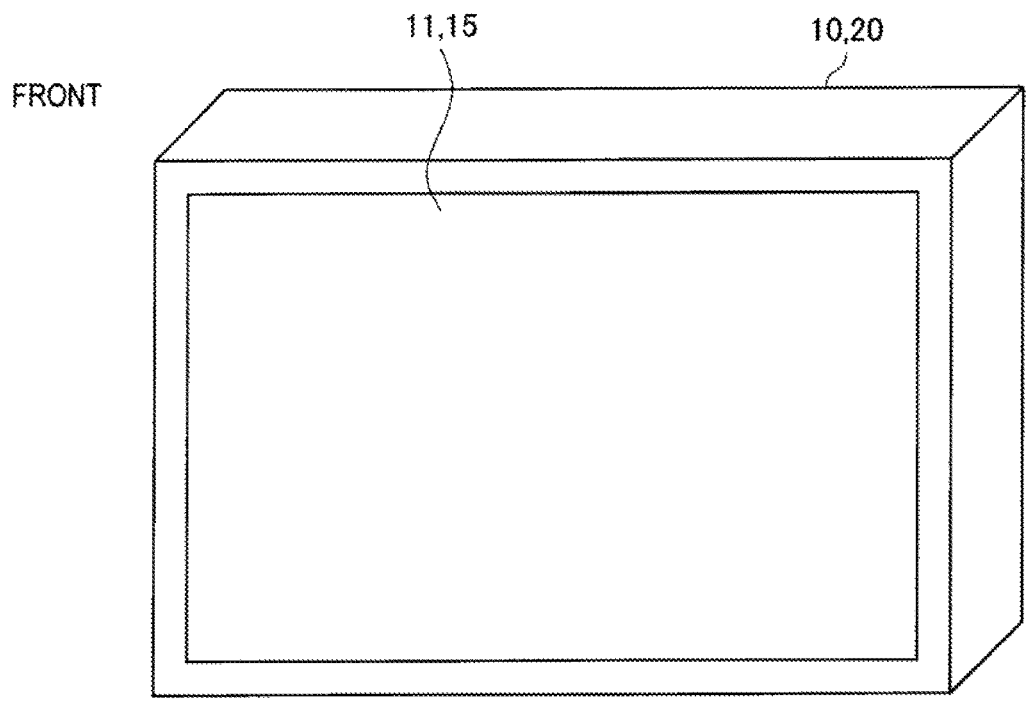
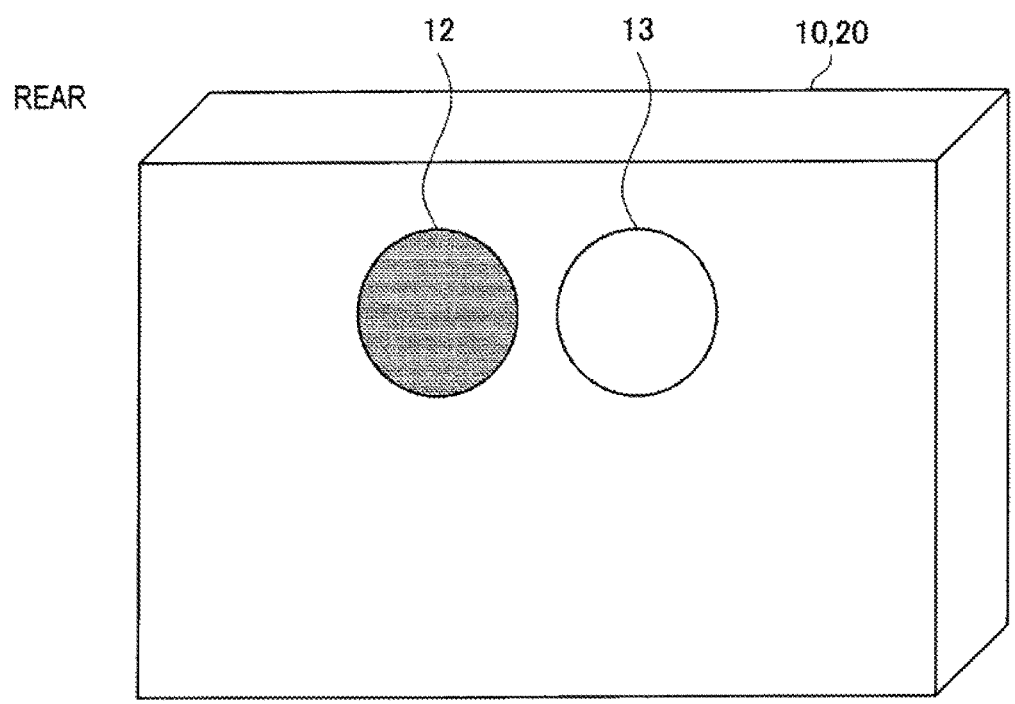

FIG. 10
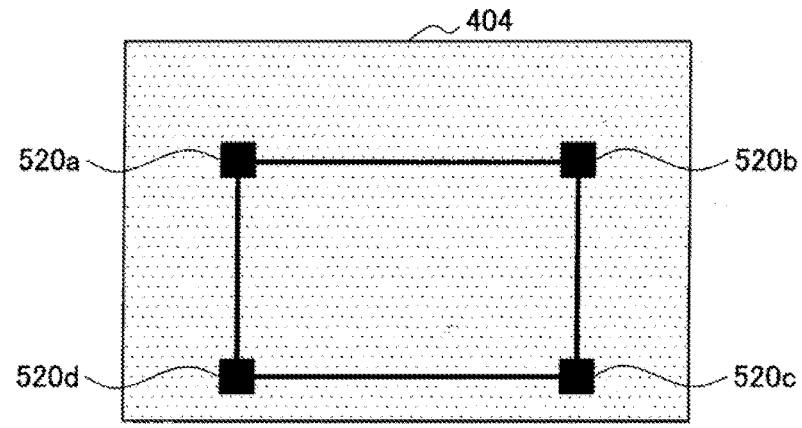
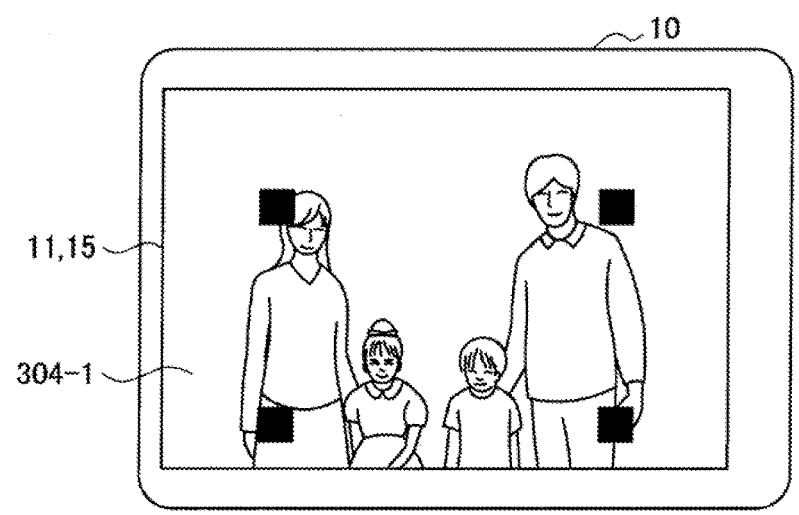
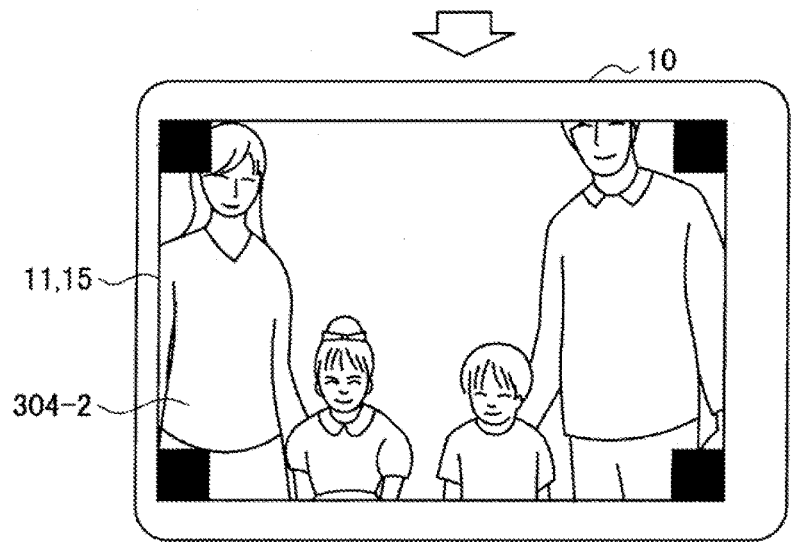

FIG. 11
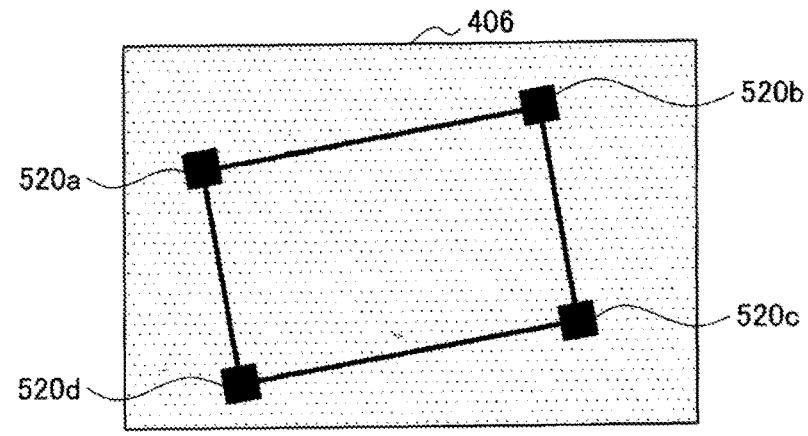
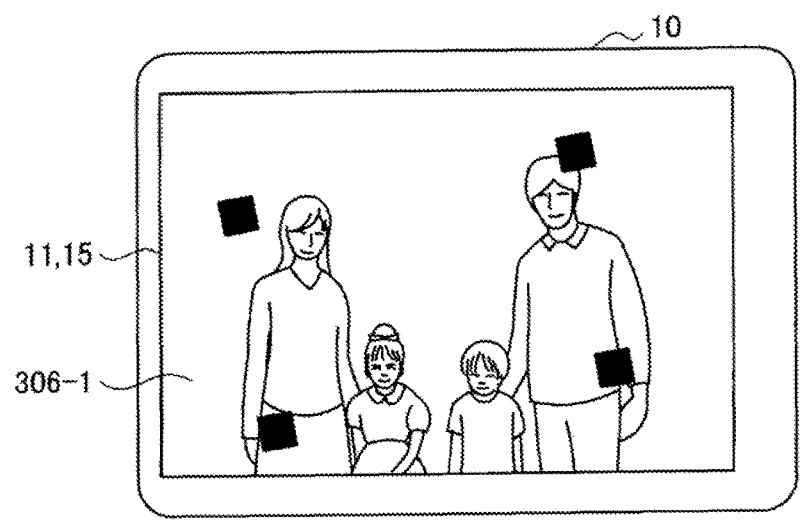
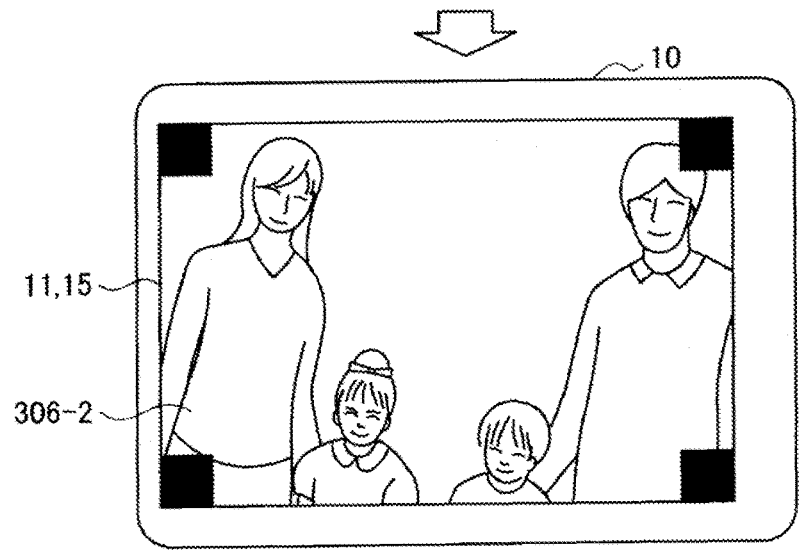

FIG. 19
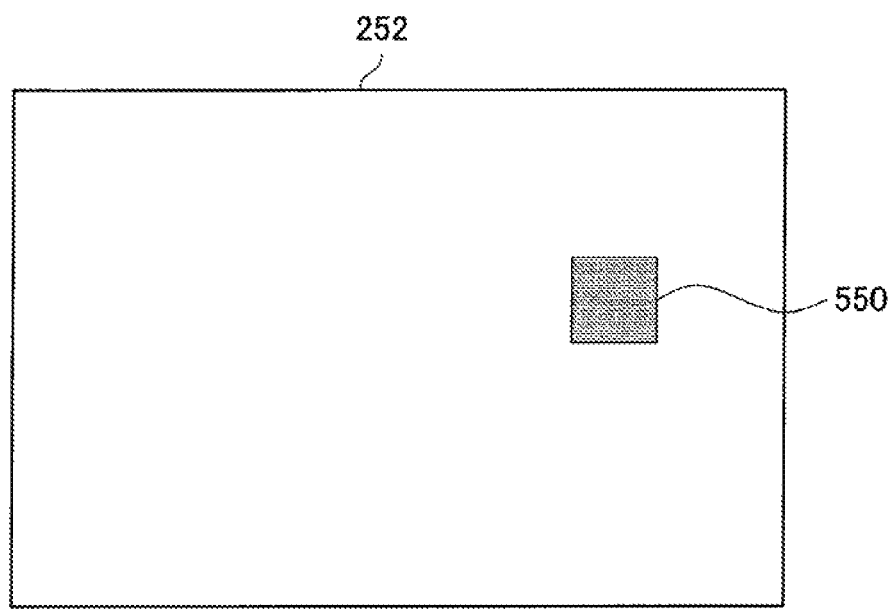
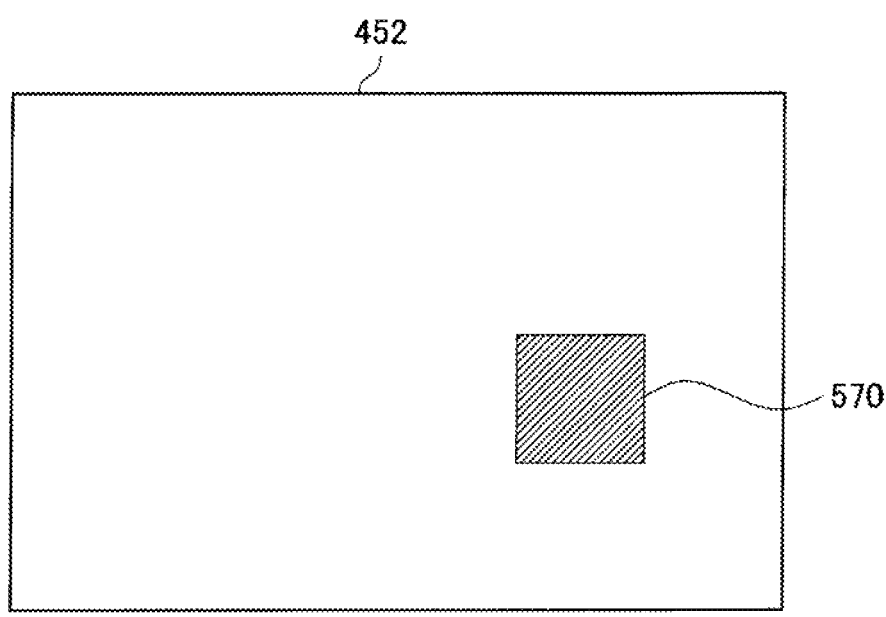

FIG. 20
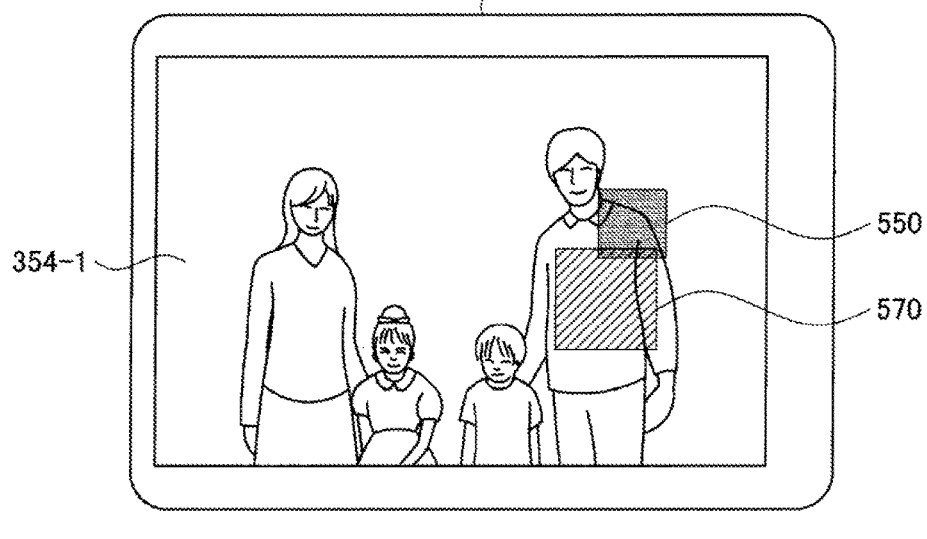
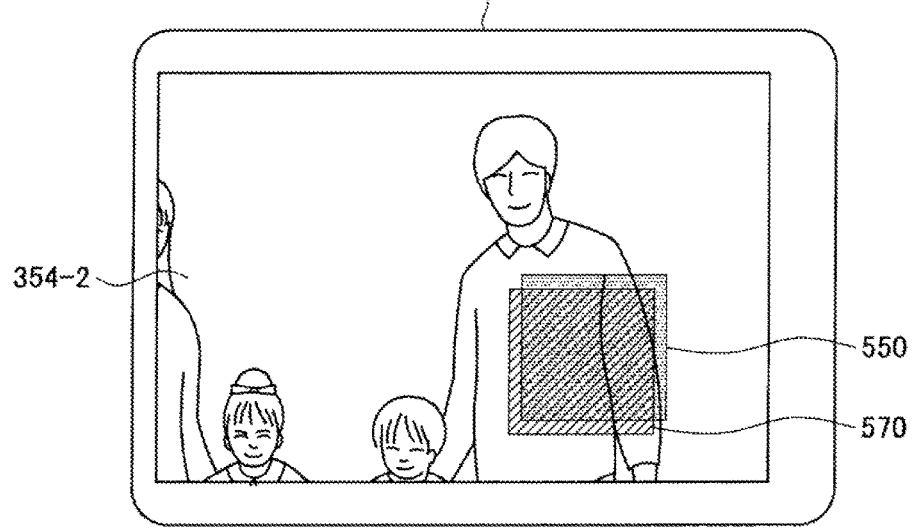

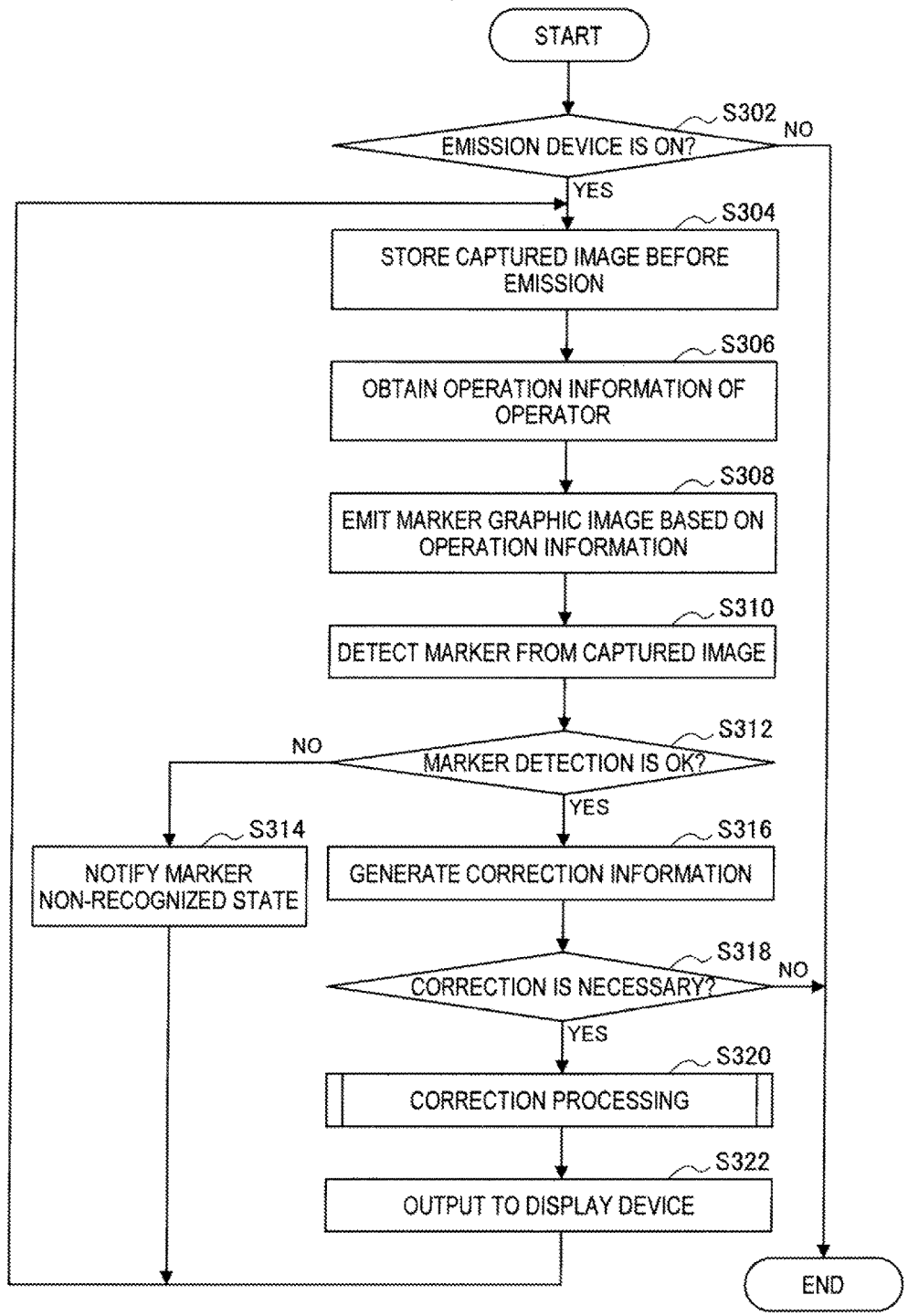

INFORMATION PROCESSING APPARATUS AND INFORMATION PROCESSING METHOD

BACKGROUND OF THE INVENTION

Field of the Invention

The present invention relates to an information processing apparatus, an information processing method, and a program.

Description of the Related Art

In recent years, projector-equipped cameras are available on the market. Regarding these cameras, Japanese Patent Application Laid-Open No. 2008-129120 indicates that a displacement between a camera's image capturing range and a projector emission range can be corrected by changing a camera's zoom ratio, based on the amount of displacement between an axis of a image capturing optical system and an axis of an emission optical system.

SUMMARY OF THE INVENTION

However, the image capturing device described in. Japanese Patent Application Laid-Open No. 2008-129120 is made on the assumption that a image capturing unit and an emission unit are arranged such that the amount of displacement therebetween is constant. Therefore, there is an issue in that Japanese Patent Application Laid-Open No. 2008-129120 may not be applied to an image capturing device having a emission unit arranged to be movable in any direction and an apparatus separately including an image capturing unit and an emission unit.

In view of the foregoing, it is desirable to provide a novel and improved information processing apparatus, information processing method, and program which can generate correction information for correcting a difference between an image capturing range and an emission range in a case where an arrangement between the image capturing unit and the emission unit is not constant.

According to an embodiment of the present invention, here is provided an information processing apparatus including an image obtaining unit for obtaining a captured image onto which an emission graphic image including a marker serving as a reference is emitted, and a correction information generation unit for generating correction information, for making an emission range and an image capturing range be the same, from a difference between the emission range onto which the emission graphic image is emitted and the image capturing range of the captured image, based on the marker in the captured image and the marker in the emission graphic image.

The information processing apparatus may further include a correction unit for correcting a corrected image for correcting an image obtained by the image obtaining unit based on the correction information, so that a range onto which the marker graphic image is emitted becomes a display range, and a display control unit for causing a display device to display the corrected image.

The correction information generation unit may generate the correction information from a difference between a position and a shape of the detected marker and a predicted position and a predicted shape of the marker in a case where the emission range and the image capturing range are the same.

The information processing apparatus may further include an operation information obtaining unit for obtaining operator's operation information, and an emission control unit for controlling emission of the emission graphic image generated based on the operation information. The image obtaining unit may generate the correction information based on the marker generated based on the operation information within the emission graphic image.

The correction information generation unit may detect the marker from a difference between the captured images before and after the emission graphic image is emitted.

According to another embodiment of the present invention, here is provided an information processing method including the steps of obtaining a captured image onto which an emission graphic image including a marker serving as a reference is emitted, and generating correction information, for making an emission range and an image capturing range be the same, from a difference between the emission range onto which the emission graphic image is emitted and the image capturing range of the captured image, based on the marker in the captured image and the marker in the emission graphic image.

According to another embodiment of the present invention, here is provided a program for causing a computer to function as an information processing apparatus including an image obtaining unit for obtaining a captured image onto which an emission graphic image including a marker serving as a reference is emitted, and a correction information generation unit for generating correction information, for making an emission range and an image capturing range be the same, from a difference between the emission range onto which the emission graphic image is emitted and the image capturing range of the captured image, based on the marker in the captured image and the marker in the emission graphic image.

As described above, according to the present invention, the correction information for correcting the difference between the image capturing range and the emission range can be generated in a case where the arrangement between the image capturing unit and the emission unit is not constant.

BRIEF DESCRIPTION OF THE DRAWINGS

FIG. 1 is a schematic diagram illustrating an external appearance of an information processing apparatus according to first and second embodiments of the present invention;

FIG. 10 is an explanatory diagram illustrating an example of correction in a case where an image is neither rotated nor distorted;

FIG. 11 is an explanatory diagram illustrating an example of correction in a case where an image is rotated;

FIG. 19 is an explanatory diagram illustrating an example of a marker image for image capturing and an emitted marker image;

FIG. 20 is an explanatory diagram illustrating an example of correction; and

FIG. 21 is a flowchart illustrating an information processing method according to the embodiment:

DETAILED DESCRIPTION OF THE EMBODIMENT

Figure 2:
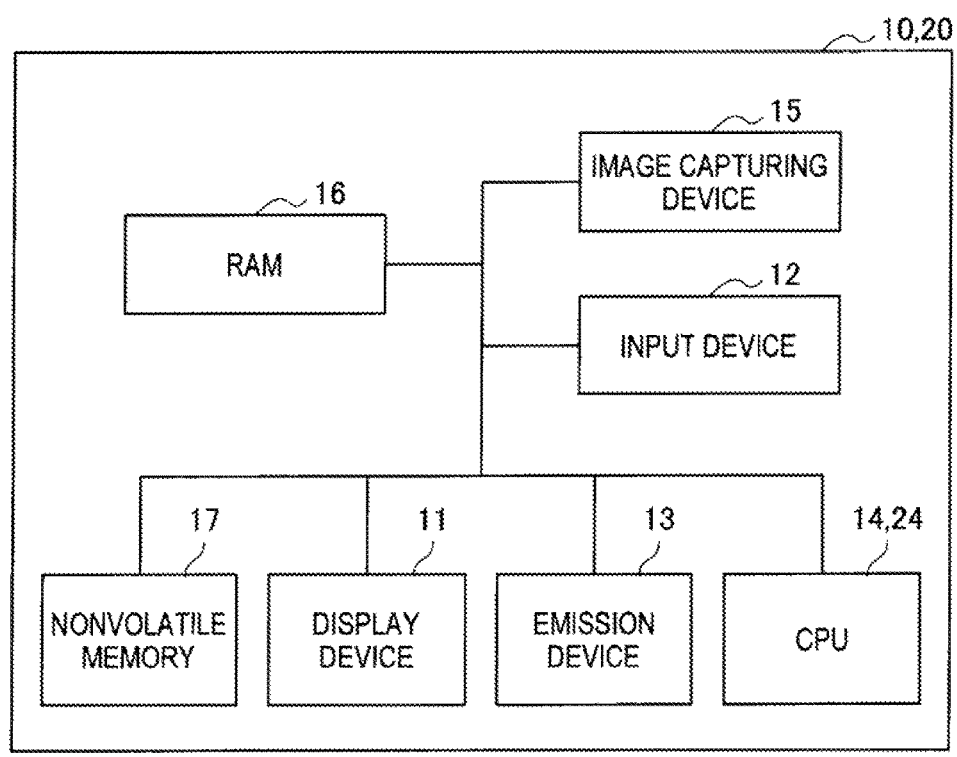
FIG. 2 is a hardware configuration diagram illustrating the information processing apparatus according to the embodiments.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The following explanation will be made in an order described below.

1. Overview
2. First embodiment
2-1. Functional configuration
2-2. Operation
3. Second embodiment
3-1. Functional configuration
3-2. Operation
<1. Overview>

First, an overview of the first and second embodiments will be explained with reference to FIG. 1. The information processing apparatus 10 according to the present embodiment mainly includes an image capturing device (camera) for capturing an image of a subject, an emission device (projector) for projecting a video image onto the subject, a display device (display) for displaying the captured image taken by the camera, and the like. As shown in FIG. 1, one face (front surface) of the information processing apparatus 10 is arranged with a display 11. The other face (back surface) of the information processing apparatus 10 is arranged with a camera lens 12 and a projector lens 13. In the explanation below, the camera including the camera lens 12 is referred to as an image capturing device 12 or a camera 12. The projector including the projector lens 13 is referred to as an emission device 13 or a projector 13.

In the information processing apparatus 10, the camera 12 and the projector 13 are arranged at fixed positions of the casing of the information processing apparatus 10. The image of the subject taken by the camera 12 is displayed on the display 11. The projector 13 projects a projection image onto the subject. Then, the display 11 displays the subject onto which the projection image is projected.

Subsequently, a hardware configuration of the information processing apparatus 10 will be explained with reference to FIG. 2. FIG. 2 is a block diagram illustrating the hardware configuration of the information processing apparatus 10. As shown in FIG. 2, the information processing apparatus 10 includes a display device (display) 11, an image capturing device (camera) 12, an emission device (projector) 13, a CPU 14, an input device 15, a RAM (Random Access Memory) 16, a nonvolatile memory 17, and the like.

The CPU 14 functions as a calculation processing unit and a control device, so as to control overall operation in the information processing apparatus 10 according to various kinds of programs. The CPU 104 may be a microprocessor. The RAM 16 temporarily stores programs used during execution of the CPU 14 and parameters and the like that change as necessary during the execution. These are connected with each other by a host bus constituted by a CPU bus and the like. The nonvolatile memory 17 stores programs, calculation parameters, and the like used by the CPU 14. The nonvolatile memory 17 may be, for example, a ROM (Read Only Memory), a flash memory, and the like.

The display device II is an example of an output device for outputting information. The display device 11 may be, for example, a liquid crystal display (LCD) device, and an OLED (Organic Light Emitting Diode) device.

The image capturing device 12 has a function of causing a CCD to convert light obtained through an image capturing lens into an electric signal so as to convert an analog signal into a digital signal, thus capturing an image of a subject. The image taken by the image capturing device 12 is displayed as a preview image on the display device 11.

The emission device 13 has a function of emitting light onto a subject through an emission lens. The emission device 13 projects a projection image onto a subject according to control of the CPU 14.

The input device 15 includes, for example, input means for a user to input information such as a touch panel, buttons, switches, and levers, and an input control circuit for generating an input signal based on user input and outputting the input signal to the CPU 14. In the explanation below, the input device 15 is referred to as a touch panel 15, because this explanation mainly relates to a case where the input device 15 is the touch panel laminated on the display device 11.

Figure 3:
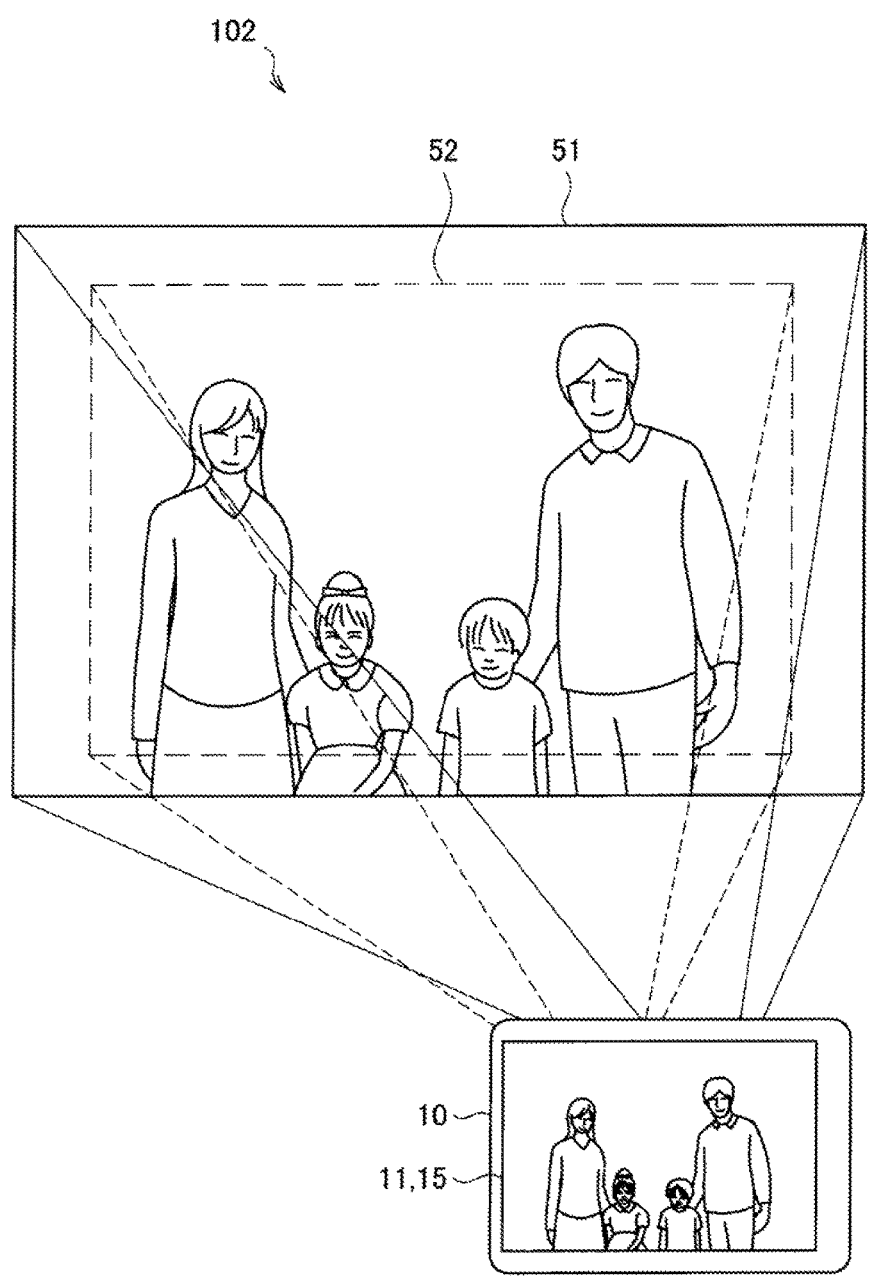
FIG. 3 is an explanatory diagram illustrating an overview of functions of the information processing apparatus according to the embodiments.

Subsequently, an overview of functions of the information processing apparatus 10 according to the present embodiment will be explained with reference to FIG. 3. FIG. 3 is an explanatory diagram illustrating an overview of functions of an information processing apparatus according to the first and second embodiments of the present invention.

Suppose a case where an optical axis of the image capturing device 12 is different from an optical axis of the emission device 13 as shown in FIG. 3. In order to make an image capturing range 51 of the image capturing device 12 be the same as an emission range 52 of the emission device 13, it is desired to recognize and correct the amount of displacement between the image capturing range 51 and the emission range 52. A preview range, i.e., a range displayed on the display device 11, is the same as the image capturing range 51 when an image captured by the image capturing device 12 is displayed as it is. However, when the captured image is corrected by software processing, the preview range may be different from the image capturing range 51. Therefore, they may be distinguished as necessary. In the first and second embodiments below, the preview range 53 and the emission range 52 are synchronized based on the amount of displacement between the image capturing range 51 and the emission range 52, for example.

Figure 4:
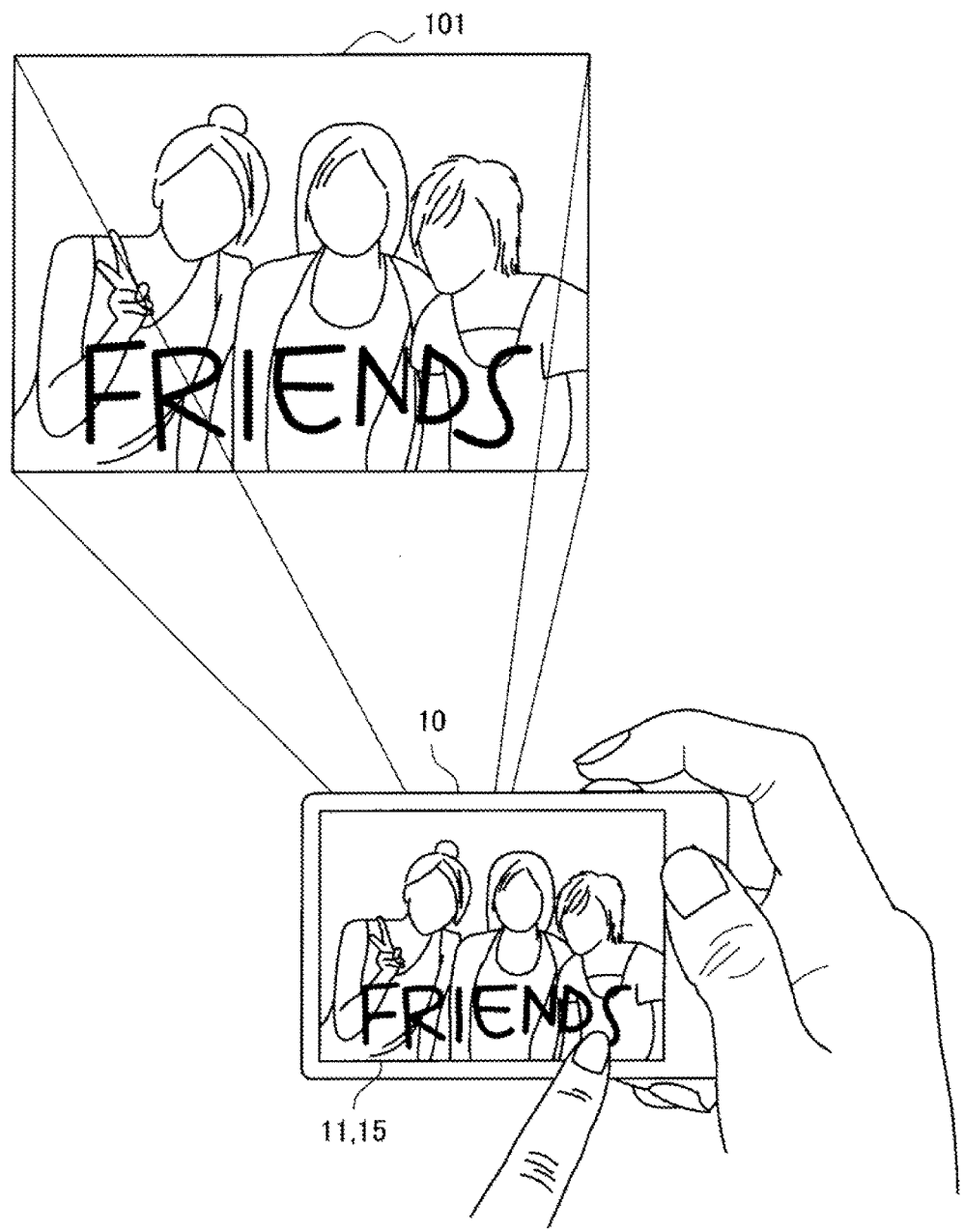
FIG. 4 is an example of user's experience which can be realized by the information processing apparatus according to the embodiments.

As explained in FIG. 3, when the preview range 53 and the emission range 52 are synchronized, a graphic image can be emitted to a position of an actual object corresponding to a position specified by an operator on the touch panel 15 as shown in FIG. 4.

In the second embodiment of the present invention, the information processing apparatus is referred to as an information processing apparatus 20, and the CPU is referred to as a CPU 24. In the explanation about the overview, explanation about the information processing apparatus 20 is omitted since the information processing apparatus 20 is the same as the information processing apparatus 10. In the explanation, only portions different from the information processing apparatus 10 will be explained later in detail.

<2. First Embodiment>

(2-1. Functional Configuration)

Figure 5:
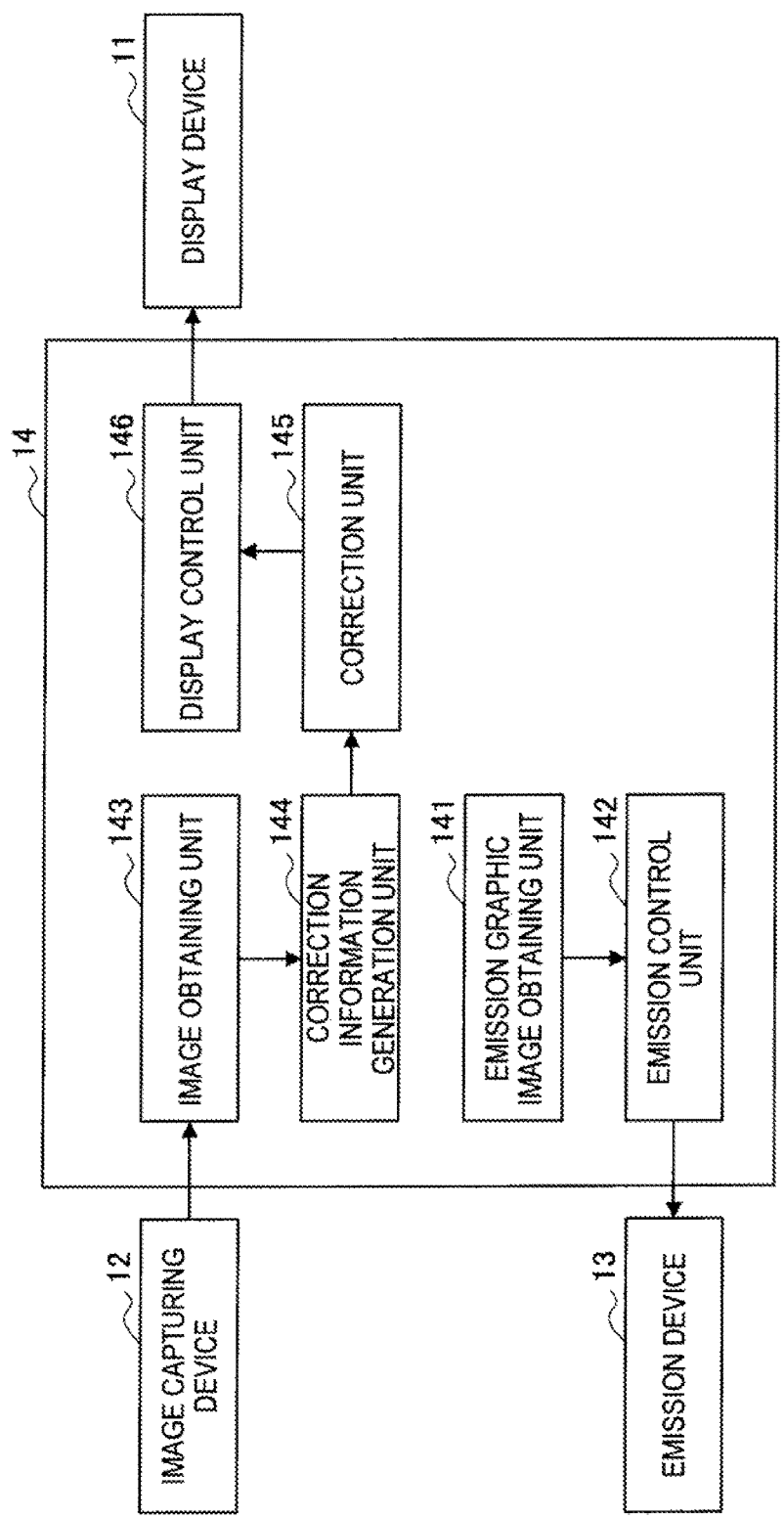
FIG. 5 is a functional block diagram illustrating the information processing apparatus according to the first embodiment of the present invention.

Subsequently, a functional configuration of the information processing apparatus 10 according to the first embodiment of the present invention will be explained with reference to FIG. 5. FIG. 5 is a functional block diagram illustrating the information processing apparatus 10 according to the first embodiment of the present invention. The CPU 14 of the information processing apparatus 10 mainly includes functions of an emission graphic image obtaining unit 141, an emission control unit 142, an image obtaining unit 143, a correction information generation unit 144, a correction unit 145, and a display control unit 146.

Figure 6:
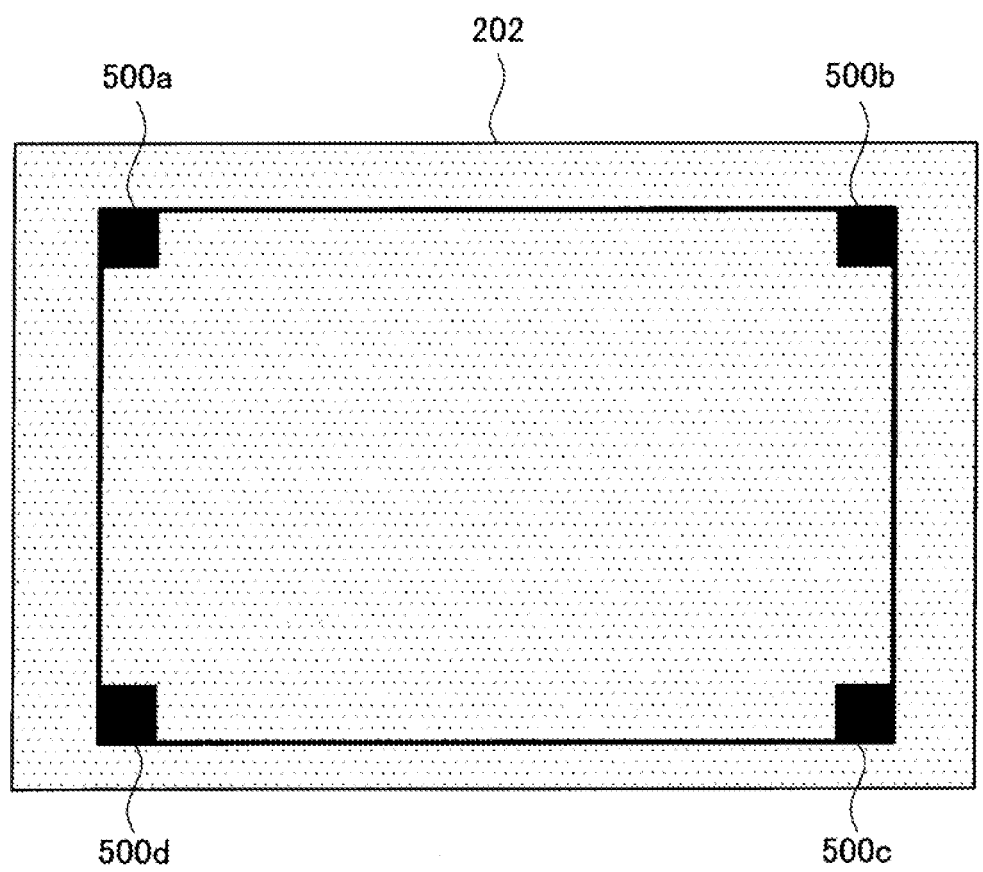
FIG. 6 is an explanatory diagram for illustrating functions of the information processing apparatus according to the embodiment.

The emission graphic image obtaining unit 141 obtains an emission graphic image including a marker representing an emission reference position. In the present embodiment, an emission graphic image 202 is used. The emission graphic image 202 includes square markers 500 fitting within four corners as shown in FIG. 6. When the emission graphic image 202 is stored in a storage unit such as the nonvolatile memory 17 in advance, the emission graphic image generation unit 141 obtains the emission graphic image 202 from the storage unit, and inputs it to the emission control unit 142.

In this specification and the appended drawings, a plurality of elements playing substantially the same roles may be distinguished by being denoted with different alphabets suffixed to the same reference numerals. For example, the plurality of elements playing substantially the same roles are distinguished by being denoted with reference numerals such as a marker 500a and a marker 500b, as necessary. However, when it is not necessary to particularly distinguish the plurality of constituent elements playing substantially the same function configuraions, they are denoted with the same reference numeral. For example, when it is not necessary to particularly distinguish elements such as a marker 500a and a marker 500b, each of them is simply referred to as a marker 500.

The emission control unit 142 controls emission of a graphic image emitted by the emission device 13. The emission control unit 142 controls emission of the emission graphic image generated by the emission graphic image generation unit 141.

Figure 7:
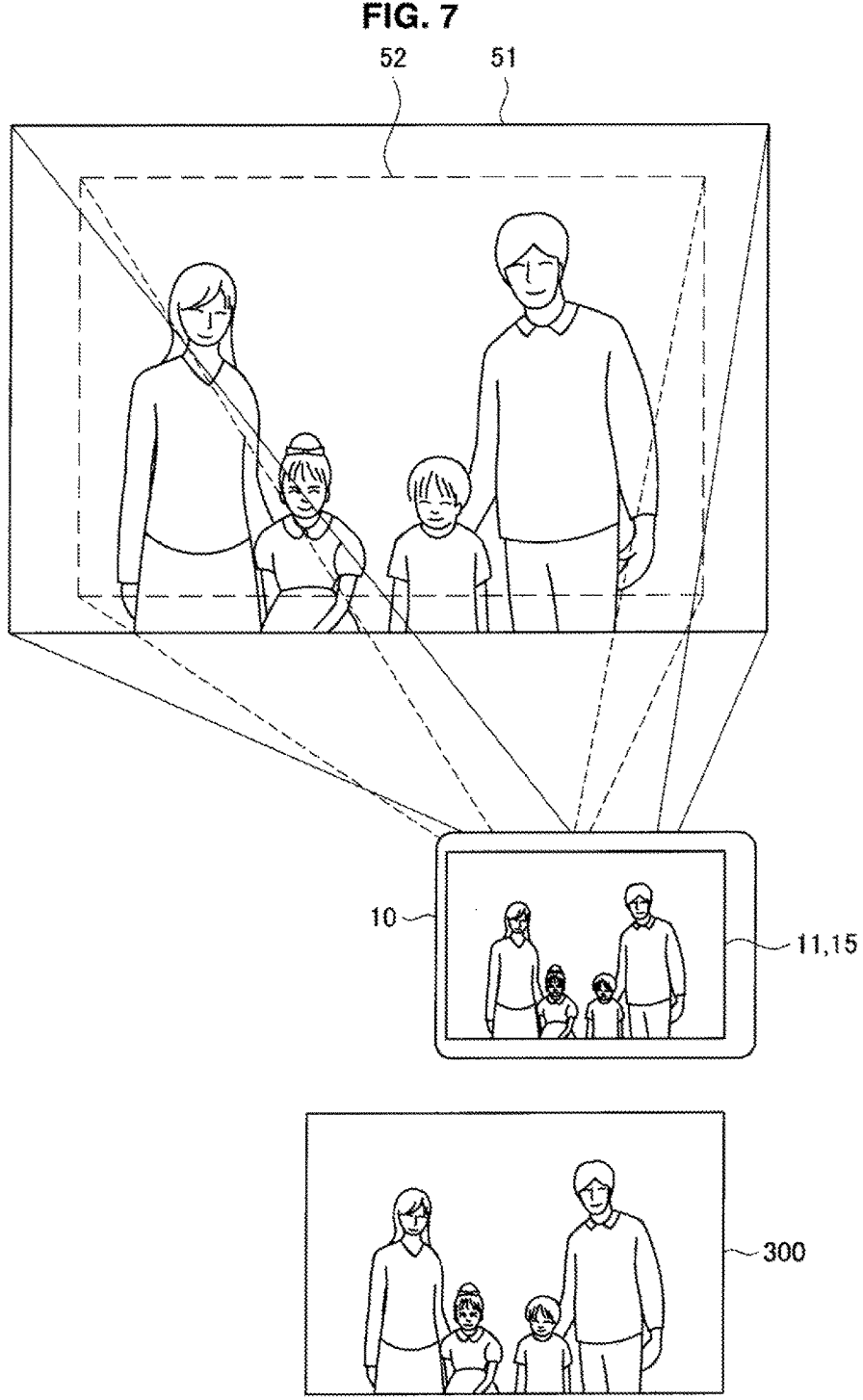
FIG. 7 is an explanatory diagram for illustrating functions of the information processing apparatus according to the embodiment.
Figure 8:
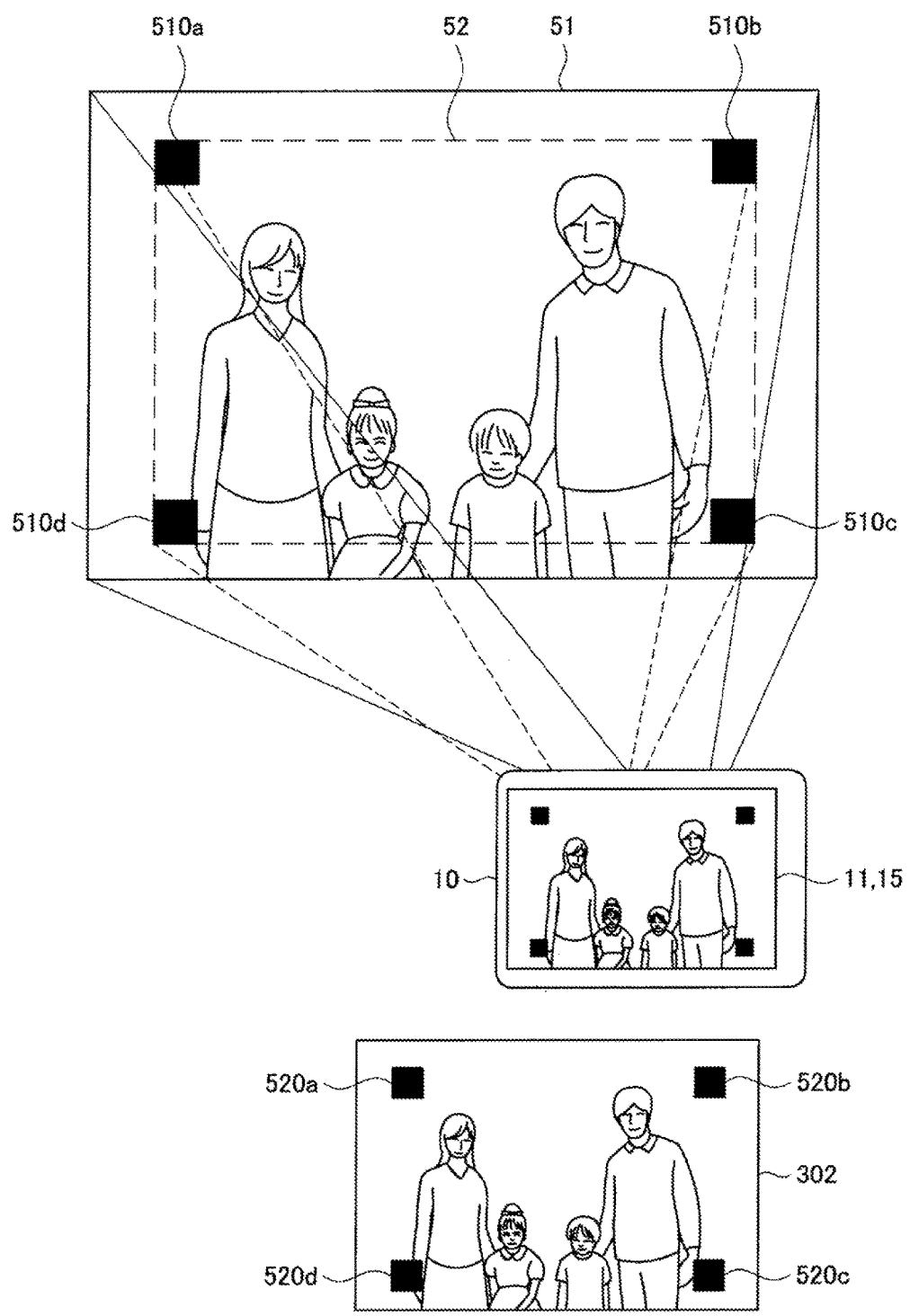
FIG. 8 is an explanatory diagram for illustrating functions of the information processing apparatus according to the embodiment.
Figure 9:
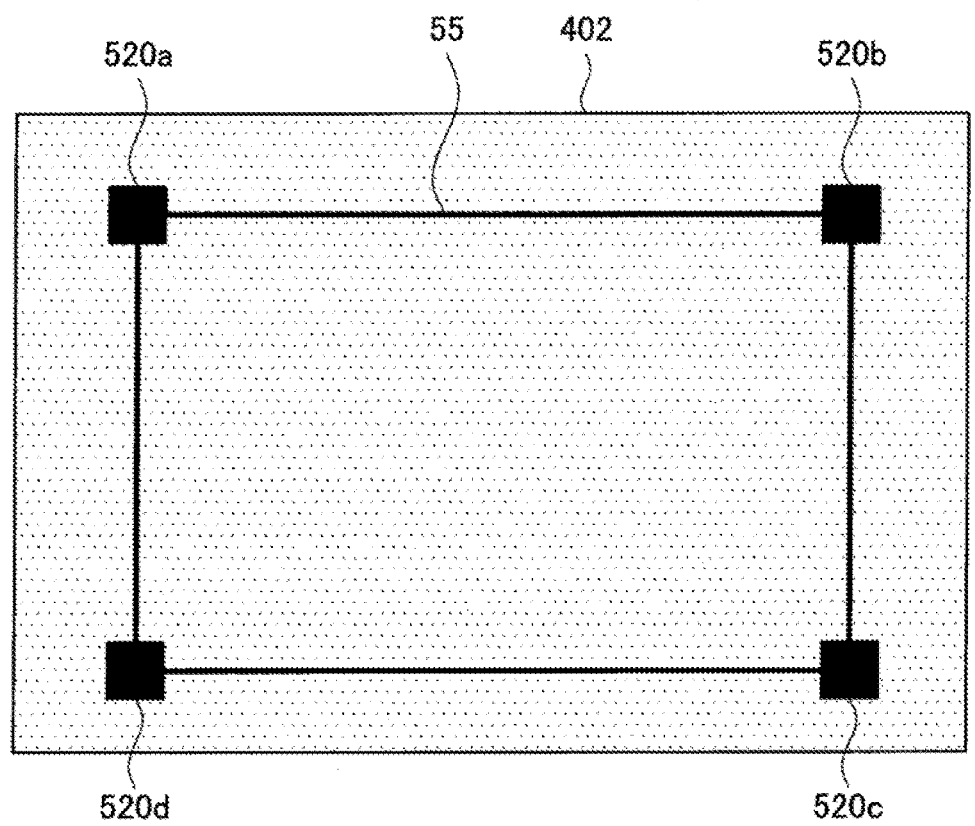
FIG. 9 is an explanatory diagram illustrating an example of a marker image obtained by image capturing.

The image obtaining unit 143 obtains the captured image by controlling the image capturing device 12. First, as shown in FIG. 7, the image obtaining unit 141 obtains a captured image 300 before the emission graphic image including the marker 500 is emitted. Subsequently, the image obtaining unit 143 obtains a captured image 302 (see FIG. 8) onto which the emission graphic image 202 shown in FIG. 6 is emitted.

In the present embodiment, a marker in the emission graphic image is referred to as a marker 500. A marker appearing on an actual object onto which the marker 500 is emitted is referred to as an emitted marker 510. A marker in a captured image obtained by capturing an image of the emitted marker 510 is referred to as a captured marker 520.

The correction information generation unit 144 obtains a difference image 402 by performing difference processing and rectangle detection processing on the captured image 300 onto which the emission graphic image 202 is not emitted and the captured image 302 onto which the emission graphic image 202 is emitted. Then, correction information for correcting the captured image is generated so that the preview range and the emission range overlap one another, based on difference information between the captured marker 520 included in the difference image 402 and the marker 500 in the emission graphic image 202. Then, the correction information generation unit 144 inputs the generated correction information into the correction unit 145.

The correction unit 145 corrects the captured image so that the preview range and the emission range are synchronized, based on the correction information generated by the correction information generation unit 144. At this occasion, the correction is performed using image processing achieved with software and change of an optical zoom ratio. Subsequently, specific examples of correction methods will be explained using FIGS. 10 to 12.

FIG. 10 is an explanatory diagram in a case where an image is determined not to be rotated or distorted based on a position, a shape, and the like of the captured marker 520 in the difference image 404. In this case, the correction unit 145 changes an optical zoom ratio or a digital zoom ratio, and generates a captured image 304-2 corrected so that the marker 510 in the captured image 304-1 fits within four corners of the preview image, and the generated captured image 304-2 is input to the display control unit 146.

FIG. 11 is an explanatory diagram in a case where an image is determined not to be distorted but is determined to be rotated, based on a position, a shape, and the like of the captured marker 520 within the difference image 406. In this case, the correction unit 145 performs image processing by software, and generates a captured image 306-2 rotated and enlarged/corrected so that the captured marker 520 in the captured image 306-1 fits within four corners of the preview image, and the generated captured image 306-2 is input to the display control unit 146. At this occasion, this enlargement processing may be performed by changing the optical zoom ratio or changing the digital zoom ratio by software processing.

Figure 12:
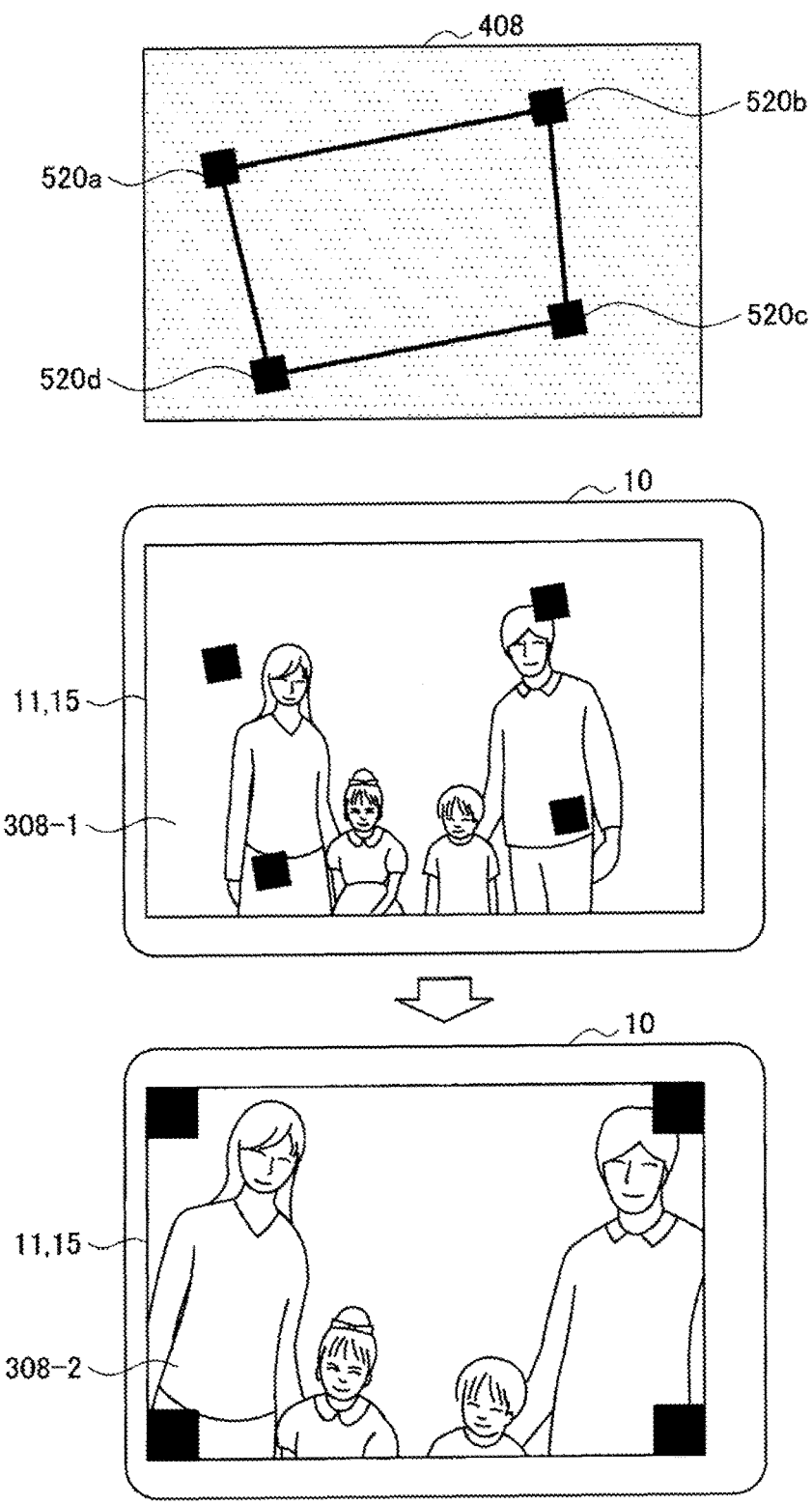
FIG. 12 is an explanatory diagram illustrating an example of correction in a case where an image is rotated and distorted.

FIG. 12 is an explanatory diagram in a case where an image is determined to be rotated and distorted, based on a position, a shape, and the like of the captured marker 520 within the difference image 408. In this case, the correction unit 145 corrects the rotation and the distortion by software processing, and changes the optical zoom ratio or the digital zoom ratio. With the above processing, the correction unit 145 generates a captured image 308-2 corrected so that the captured marker 520 in the captured image 308-I fits within four corners of the preview image, and the generated captured image 308-2 is input to the display control unit 146.

As described above, the correction unit 145 generates a preview image in which the preview range and the emission range are synchronized, based on the correction information.

The display control unit 146 controls a screen display of the display device 11. The display control unit 146 causes the display device 11 to display the preview image generated by causing the correction unit 145 to correct the captured image.

(2-2. Operation)

Figure 13:
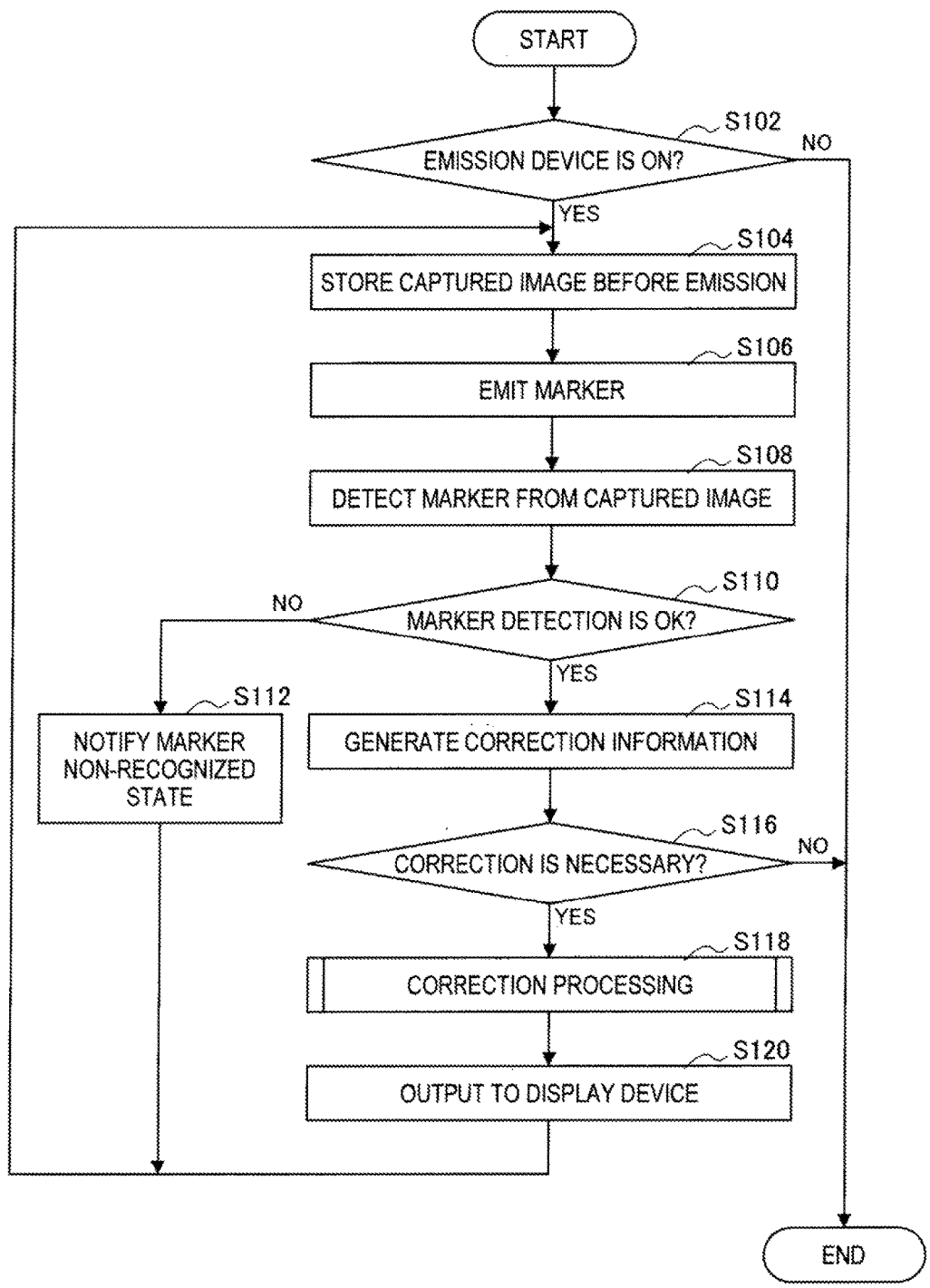
FIG. 13 is a flowchart illustrating an information processing method according to the embodiment.

The functions of the information processing apparatus 10 and operation thereof have been hereinabove explained. Now, the flowchart of FIG. 13 summarizing the operation of the information processing apparatus 10 will be explained. FIG. 13 is a flowchart illustrating operation of the information processing apparatus 10 according to the first embodiment of the present invention.

First, the CPU 14 determines whether the emission device 13 is activated or not (S102). The synchronization operation as shown in FIG. 13 is not necessary when the emission device 13 is not activated. Therefore, when the emission device 13 is determined not to be activated in step S102, the processing is terminated.

On the other hand, when the emission device 13 is determined not to be activated in step S102, the image obtaining unit 143 stores, in the storage unit, the captured image onto which the marker is not emitted (S104). Then, the emission graphic image obtaining unit 141 obtains the emission graphic image including the marker from the storage unit, and the emission control unit 142 controls emission of the emission graphic image including the marker (S106).

When the emission graphic image including the marker is emitted, the image obtaining unit 143 stores the captured image in the storage unit again, and the correction information generation unit 144 analyzes the captured image. At this occasion, the analytic processing includes the rectangular processing and the difference processing between images before and after the emission of the marker as described above. As a result of the analysis performed by the correction information generation unit 144, a determination is made as to whether the captured marker 520 is detected from the captured image (S110). When the captured marker 520 is not detected, the display control unit 146 causes the display device 11 to display a message for notifying an operator that the marker is not recognized (S112), and processing of step S104 is subsequently performed.

When the emission range is not included in the image capturing range, the marker may not be emitted onto the image capturing range, and the marker may not be recognized. In this case, when the zoom ratio of the image capturing device 12 is recognized, and the image capturing range can be enlarged, the zoom ratio may be automatically changed, which is not shown in the figures. Alternatively, a message indicating that the marker is not recognized may be notified to the operator, and the operator may change the zoom ratio.

On the other hand, when the captured marker 520 is detected in the determination of step S110, the correction information generation unit 144 subsequently generates correction information based on information about the captured marker 520 and information about the marker 500 in the emission graphic image. Then, the correction information generation unit 144 determines whether correction is necessary or not (S116). When the correction is determined not to be necessary in the determination of step S116, the processing is terminated.

On the other hand, when the correction is determined to be necessary in the determination of step S116, the correction unit 145 executes correction processing (S118). Subsequently, operation of the correction processing will be explained with reference to FIG. 14 in detail.

Then, when the preview image is generated in the preview range that is synchronized with the emission range by the correction processing in step S118, the display control unit 146 causes the display device 11 to display the generated preview image (S120). Then, the processing of step S104 is subsequently performed in FIG. 13, and the above processing is repeated until the correction is no longer necessary. However, the present invention is not limited to such configuration. For example, the correction processing may be performed once after the information processing apparatus 10 is started.

Figure 14:
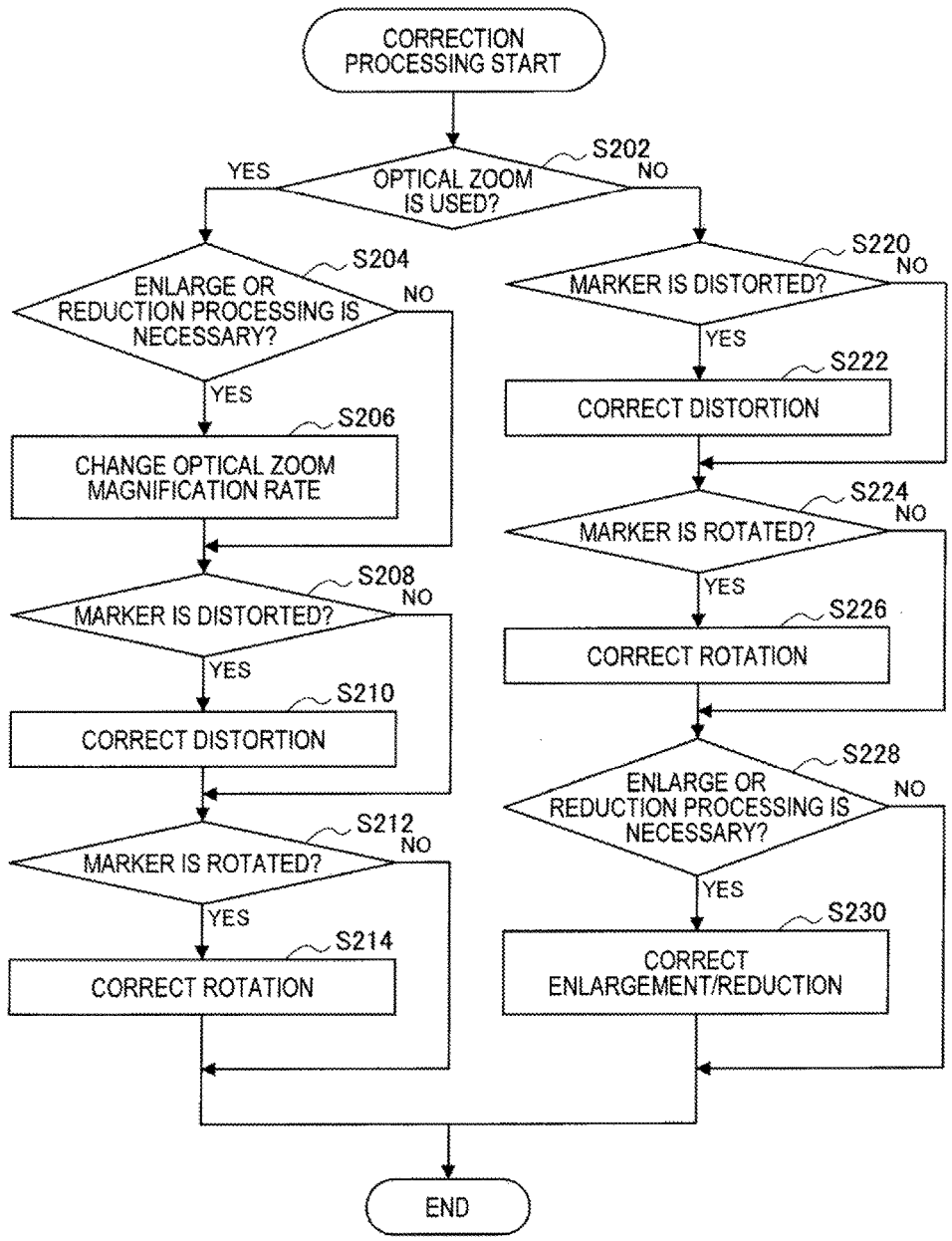
FIG. 14 is a flowchart illustrating correction processing in detail.

Now, the contents of the correction processing in step S118 of FIG. 13 are explained in detail with reference to FIG. 14. FIG. 14 is a flowchart illustrating operation of the correction processing.

First, the correction processing is changed according to whether an optical zoom is used or not (S202). This determination may be made based on, for example, whether the apparatus can use the optical zoom. Alternatively, the determination may be made according to which of the optical zoom and the digital zoom is suitable based on the analytic result of the captured image.

First, when the optical zoom is used, the correction unit 145 determines whether enlargement or reduction processing is necessary or not (S204). Then, when the enlargement or reduction processing is necessary, the correction unit 145 changes the optical zoom ratio (S206). On the other hand, when the enlargement or reduction processing is not necessary, the processing of step S206 is omitted.

Then, the correction unit 145 determines whether a rectangle formed by the captured marker 520 is distorted or not (S208). Then, when the rectangle is determined to be distorted, the correction unit 145 corrects the distortion by software processing (S210). On the other hand, when the rectangle is determined not to be distorted, the processing of step S210 is omitted.

Then, the correction unit 145 determines whether the rectangle formed by the captured marker 520 is rotated or not (S212). When the rectangle is determined to be rotated at this occasion, the correction unit 145 corrects the rotation by software processing (S214). On the other hand, when the rectangle is determined not to be rotated, the processing of step S212 is omitted.

When it is determined that the optical zoom is not used in step S202, the correction unit 145 determines whether the rectangle formed by the captured marker 520 is distorted or not (S220). Then, when the rectangle is determined to be distorted, the correction unit 145 corrects the distortion by software processing (S222). On the other hand, when the rectangle is determined not to be distorted, the processing of step S222 is omitted.

Then, the correction unit 145 determines whether the rectangle formed by the captured marker 520 is rotated or not (S224). When the rectangle is determined to be rotated at this occasion, the correction unit 145 corrects the rotation by software processing (S226). On the other hand, when the rectangle is determined not to be rotated, the processing of step S226 is omitted.

Then, the correction unit 145 determines whether enlargement or reduction processing is necessary or not (S228). Then, when the enlargement or reduction processing is necessary, the correction unit 145 changes the digital zoom ratio, and executes enlargement or reduction processing by software processing (S230). On the other hand, when the enlargement or reduction processing is not necessary, the processing of step S230 is omitted.

<3. Second Embodiment>

(3-1. Functional Configuration)

Figure 15:
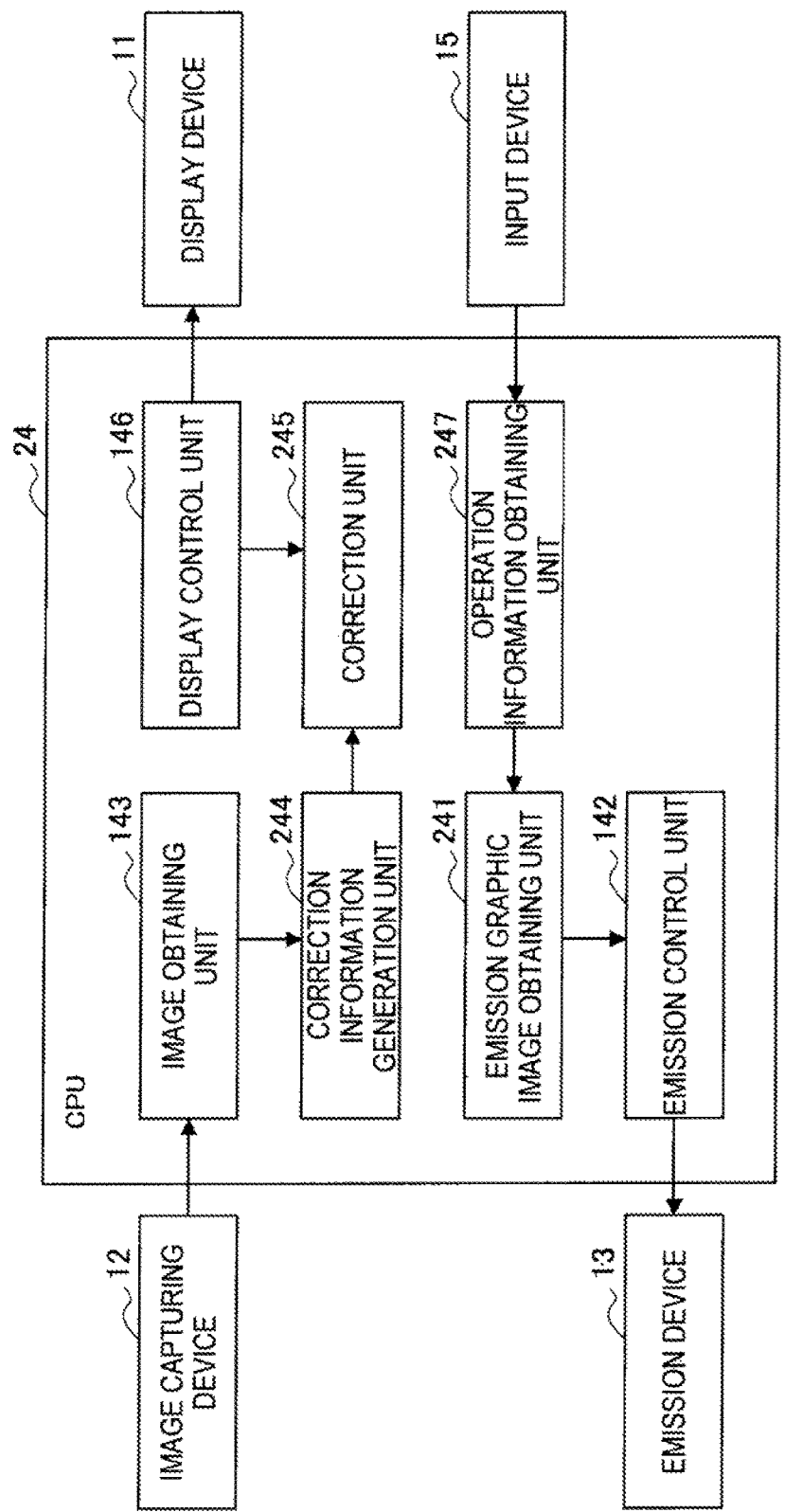
FIG. 15 is a functional block diagram illustrating an information processing apparatus according to the second embodiment of the present invention.

Subsequently, a functional configuration of the information processing apparatus 20 according to the second embodiment of the present invention will be explained with reference to FIG. 15. FIG. 15 is a functional block diagram of the information processing apparatus 20 according to the second embodiment of the present invention. The CPU 24 of the information processing apparatus 20 mainly includes functions of an emission graphic image obtaining unit 241, an emission control unit 142, an image obtaining unit 143, a correction information generation unit 244, a corrected image generation unit 245, a display control unit 146, and an operation information obtaining unit 247.

The information processing apparatus 20 according to the present embodiment is different from the information processing apparatus 10 according to the first embodiment in that the information processing apparatus 20 emits a graphic image generated according to operation information given by an operator. In the explanation below, differences from the first embodiment will be mainly described. Accordingly, explanations about the same configurations are omitted.

The operation information obtaining unit 247 obtains information about operation performed with the input device 15 by an operator. For example, the operator can give an input for selecting a graphic image, as if affixing a seal, by giving an input to a touch panel. The operator can draw characters by touching the touch panel. The operation information obtaining unit 247 obtains information about such operation, and inputs the information to the emission graphic image obtaining unit 241.

Figure 16:
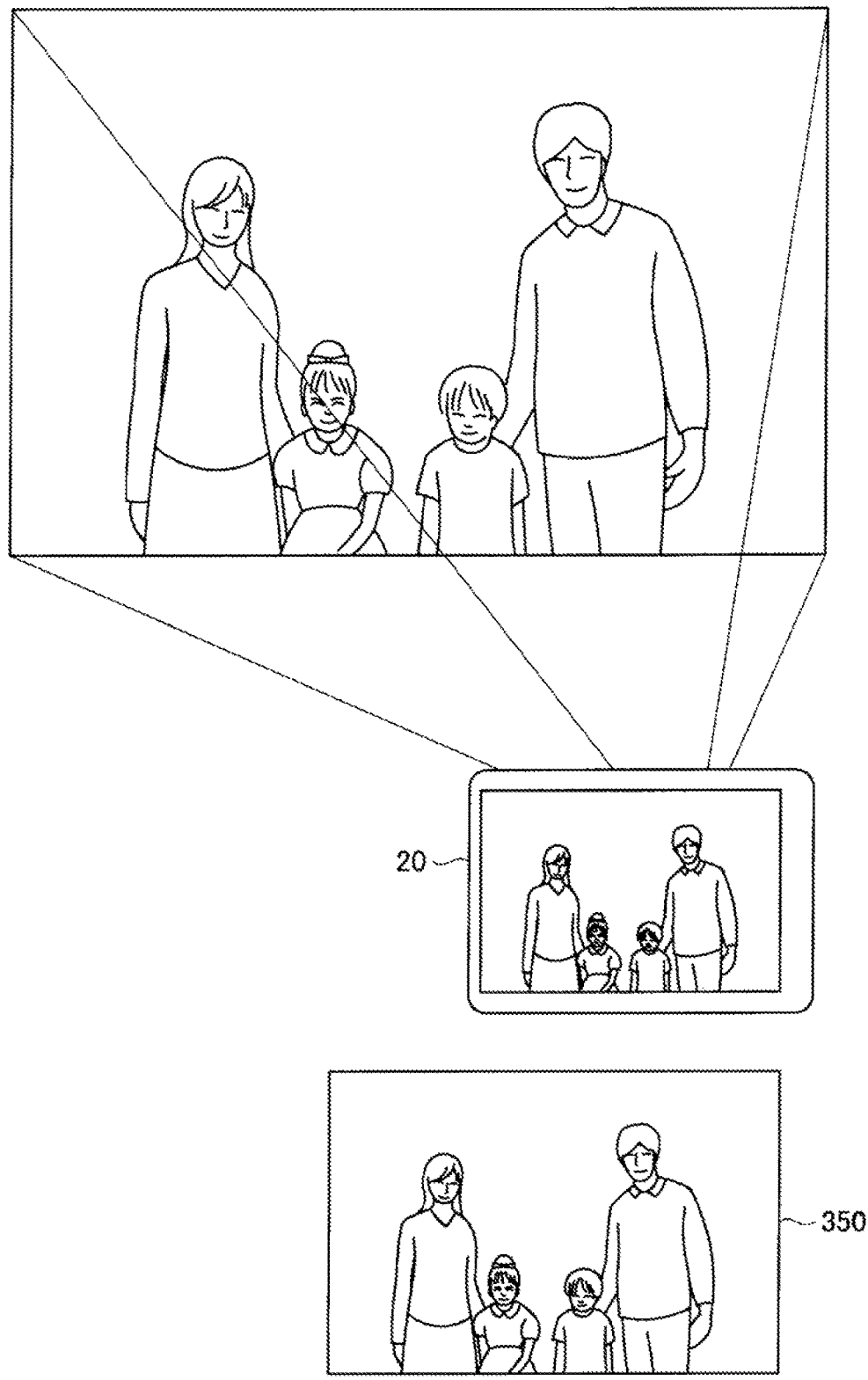
FIG. 16 is an explanatory diagram for illustrating operation of the information processing apparatus according to the embodiment.
Figure 17:
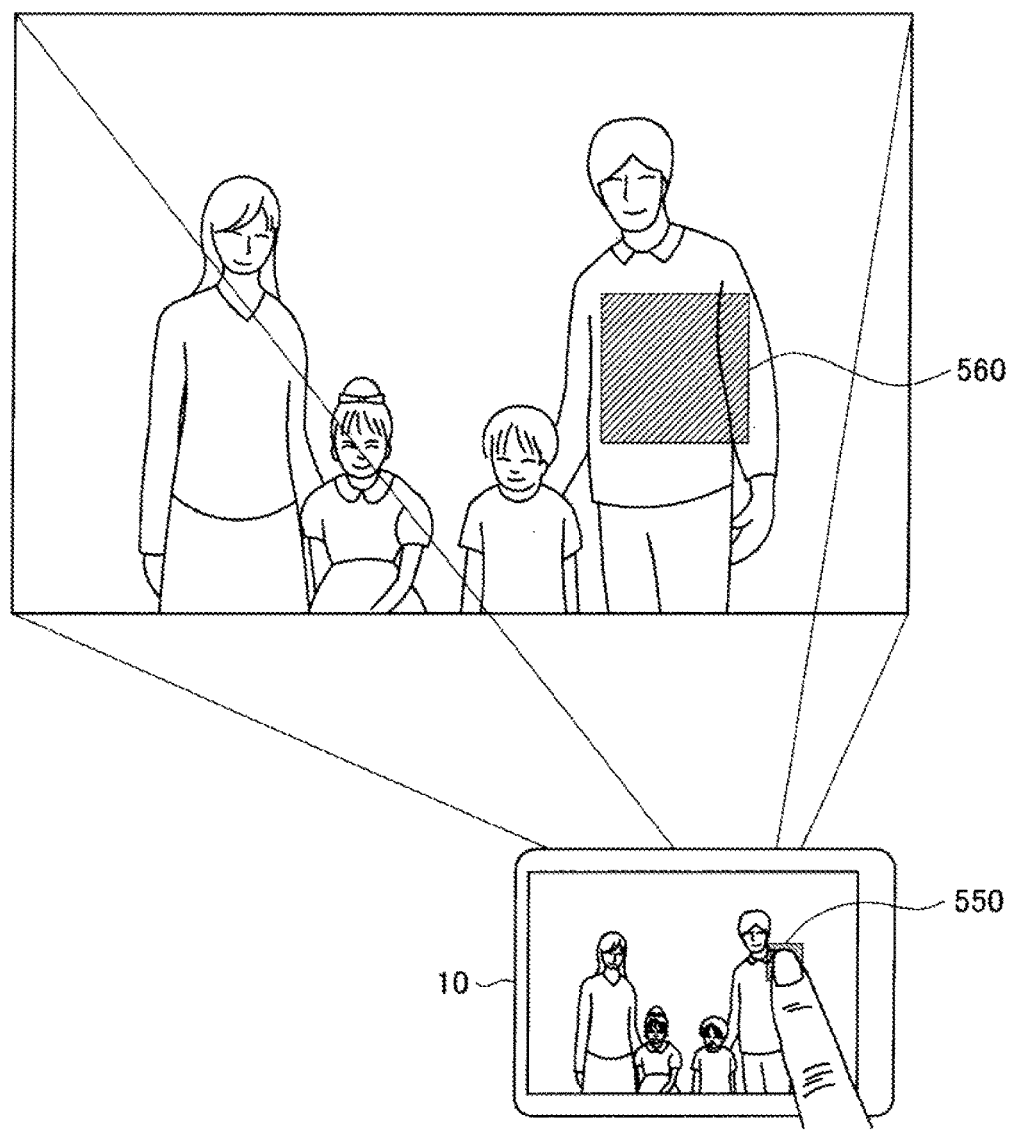
FIG. 17 is an explanatory diagram for illustrating operation of the information processing apparatus according to the embodiment.

The emission graphic image obtaining unit 241 generates an emission graphic image including a marker 550 based on operation information input from the operation information obtaining unit 247. For example, as shown in FIG. 16, the image obtaining unit 143 obtains a captured image 350 onto which the emission graphic image is not emitted. Thereafter, as shown in FIG. 17, when the operator performs operation with the touch panel 15, the operation information obtaining unit 247 obtains information about such operation. The emission graphic image obtaining unit 241 generates an emission graphic image 252 (the right figure of FIG. 19) including the marker 550 based on the operation information.

Figure 18:
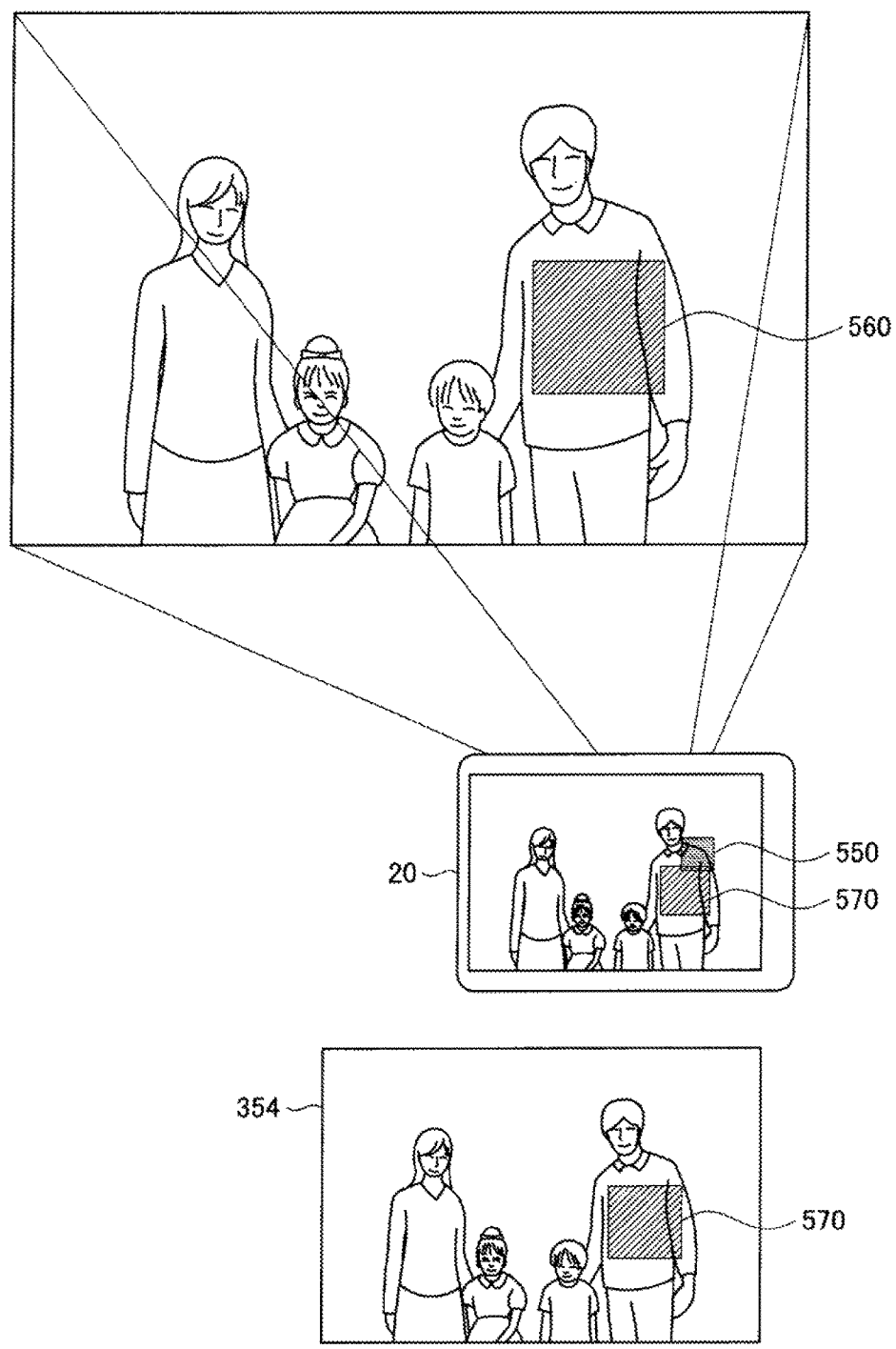
FIG. 18 is an explanatory diagram for illustrating operation of the information processing apparatus according to the embodiment.

At this occasion, the emission control unit 142 emits the generated emission graphic image 252. Then, when the preview range and the emission range are not synchronized, an emitted marker 560, i.e., a graphic image after the marker 550 is emitted, has a size and an emission position different from the size and the position of the marker 550 on a preview screen. Then, as shown in FIG. 18, the image obtaining unit 143 obtains a captured image 354 obtained by capturing an image of the emitted marker 560.

The correction information generation unit 244 obtains a difference image 452 by performing difference processing for finding difference between the captured image 354 onto which the emission graphic image is emitted and the captured image 350 onto which the emission graphic image is not emitted. Then, correction information for correcting the captured image is generated so that the preview range and the emission range overlap one another, based on difference information between the captured marker 570 included in the difference image 452 and the marker 550 in the emission graphic image 252. Then, the correction information generation unit 244 inputs the generated correction information into the correction unit 245.

The correction unit 245 corrects the captured image so that the preview range and the emission range are synchronized, based on the correction information generated by the correction information generation unit 244. At this occasion, the correction is performed using image processing achieved with software and change of an optical zoom ratio.

As shown in FIG. 20, the correction unit 245 corrects a captured image 354-1 based on the correction information obtained from a position, a size, a shape, and the like of the marker 550 of the emission graphic image and the captured marker 570 obtained by capturing the emitted emission graphic image, and generates a preview image 354-2.

In the present embodiment, the marker 550 is used to explain a rectangular marker. However, the present invention is not limited to such example. For example, when an operator selects a graphic image prepared in a tool box and places it on the touch panel 15, the selected graphic image may be used as the marker. Alternatively, when the operator draws characters and a picture using the touch panel 15, a graphic image such as the drawn characters and picture may be used as a marker. This configuration allows the operator to synchronize the preview range and the emission range by simply performing interactive operation for emitting a graphic image onto a subject, without remembering that the adjustment operation is being carried out to synchronize the preview range and the emission range.

(3-2. Operation)

Subsequently. operation of the information processing apparatus 20 will be explained with reference to FIG. 21. FIG. 21 is a flowchart illustrating operation of the information processing apparatus 20 according to the second embodiment of the present invention.

In the explanation below, step S306 and step S308 which are different from the first embodiment will be mainly described. Accordingly, explanations about the same steps as the first embodiment are omitted. The correction processing of step S320 means processings shown in step S202 to step S230 of FIG. 14.

When a captured image onto which a graphic image is not emitted is stored in step S304, the operation information obtaining unit 247 obtains operation information of the operator. Then, the emission graphic image obtaining unit 241 generates a marker based on the obtained operation information, and the emission control unit 142 controls emission of the emission graphic image including the marker (S308).

As explained above, the information processing apparatus 20 according to the second embodiment of the present invention generates the marker based on the operator's operation information. Therefore. the second embodiment is different from the first embodiment in that the emission graphic image including the generated marker is emitted.

It should be understood by those skilled in the art that various modifications, combinations, sub-combinations and alterations may occur depending on design requirements and other factors insofar as they are within the scope of the appended claims or the equivalents thereof.

For example, in the above embodiment, the information processing apparatus 10 and 20 are an apparatus including the image capturing device 12 and the emission device 13.

However, the present invention is not limited thereto. For example, the information processing apparatus 10 may obtain a captured image from a separate image capturing device and generate a graphic image to be projected, and may thereafter output the graphic image to be projected to the separate emission device. At this time, the separate emission device may be arranged on a table, or may be arranged on a ceiling.

In the above embodiments, the information processing apparatuses 10 and 20 correct the captured image based on the correction information, and generate the synchronized preview image. However, the present invention is not limited to such example. For example, when a position, a direction, or a field angle of the projector 13 can be changed, the correction information may be output to a driving mechanism for changing the position, the direction, or the field angle of the projector 13, whereby the projector 13 may adjust the emission range.

In the above embodiments, the marker serving as the reference for synchronizing the preview range and the emission range is considered to be a graphic image in a visible light, for example. However, the present invention is not limited to such example. For example, a marker may be emitted in an infrared light, and an infrared light camera may detect the marker in the infrared light.

In this specification, regarding the steps described in the flowcharts, it is to be understood that the processings performed in time series according to the described order are not necessarily processed in time series, and include processings executed in parallel or separately. Even in the steps processed in time series, it is to be understood that the order may be changed as necessary in some cases.

The present application contains subject matter related to that disclosed in Japanese Priority Patent Application JP 2010-057856 filed in the Japan Patent Office on Mar. 15, 2010, the entire content of which is hereby incorporated by reference.

What is claimed is:

1. An information processing apparatus, comprising:
   an operation information obtaining unit configured to obtain operation information of an operation corresponding to an input by an operator;
   an emission control unit configured to:
      generate an emission graphic image based on the operation information; and
      control emission of the emission graphic image on a first image of a subject;
   an image obtaining unit configured to obtain, based on control of an image capturing device, the first image of the subject, wherein the emission graphic image includes a first marker generated based on the operation information that serves as a reference;
   a correction information generation unit configured to generate correction information and to correct an emission range and an image capturing range based on the correction information such that the emission range and the image capturing range are same,
   wherein the correction information is generated from a first difference between the emission range onto which the emission graphic image is emitted and the image capturing range of the first image, based on a second marker in the first image and the first marker in the emission graphic image; and
   a correction unit configured to change a digital zoom ratio based on the correction information and capture a second image of the subject based on the changed digital zoom ratio.

2. The information processing apparatus according to claim 1,
   wherein the correction unit is further configured to correct the second image based on the correction information such that a range onto which the emission graphic image is emitted and a display range are same; and
   a display control unit configured to display the corrected second image on a display device.

3. The information processing apparatus according to claim 2,
   wherein the correction information generation unit is further configured to generate the correction information from a second difference between a position of the first marker and a predicted position of the second marker and a third difference between a shape of the first marker and a predicted shape of the second marker, based on determination that the emission range and the image capturing range are same.

4. The information processing apparatus according to claim 1, wherein the correction information generation unit is further configured to detect the second marker from a second difference between a first captured image before the emission of the emission graphic image and a second captured image after the emission of the emission graphic image.

5. An information processing method, comprising:
   obtaining, by an operation information obtaining unit, operation information of an operation corresponding to an input by an operator;
   generating, by an emission control unit, an emission graphic image based on the operation information;
   controlling, by the emission control unit, emission of the emission graphic image on a first image of a subject;
   obtaining, by an image obtaining unit, the first image of the subject, wherein the emission graphic image includes a first marker generated based on the operation information serving as a reference;
   generating, by a correction information generation unit, correction information and correcting an emission range and an image capturing range based on the correction information such that the emission range and the image capturing range are same,
   wherein the correction information is generated from a first difference between the emission range onto which the emission graphic image is emitted and the image capturing range of the first image, based on a second marker in the first image and the first marker in the emission graphic image; and
   changing, by a correction unit, a digital zoom ratio based on the correction information and capturing a second image of the subject based on the changed digital zoom ratio.

6. A non-transitory computer-readable medium having stored thereon, computer-executable instructions for causing a computer to execute operations, the operations comprising:
   obtaining operation information of an operation corresponding to an input by an operator;
   generating an emission graphic image based on the operation information;
   controlling emission of the emission graphic image on a first image of a subject;
   obtaining the first image of the subject, wherein the emission graphic image includes a first marker generated based on the operation information serving as a reference;

generating correction information and correcting an emission range and an image capturing range based on the correction information such that the emission range and the image capturing range are same, wherein the correction information is generated from a first difference between the emission range onto which the emission graphic image is emitted and the image capturing range of the first image, based on a second marker in the first image and the first marker in the emission graphic image; and changing a digital zoom ratio based on the correction information and capturing a second image of the subject based on the changed digital zoom ratio.

* * * * *